United States Patent [19]

Fowler

[11] 4,141,009
[45] Feb. 20, 1979

[54] BACK UP ALARM SYSTEM

[76] Inventor: Eugene W. Fowler, 816 Superba Ave., Venice, Calif. 90291

[21] Appl. No.: 820,828

[22] Filed: Aug. 1, 1977

[51] Int. Cl.² .............................................. B60R 25/10
[52] U.S. Cl. ...................................... 340/539; 340/63; 325/64; 307/10 AT
[58] Field of Search ........................... 340/63, 64, 224; 307/10 AT; 325/64

[56] References Cited
U.S. PATENT DOCUMENTS

| | | | |
|---|---|---|---|
| 3,893,069 | 7/1975 | Mason | 340/63 |
| 4,012,728 | 3/1977 | Fowler | 340/224 |

*Primary Examiner*—Alvin H. Waring
*Attorney, Agent, or Firm*—Daniel Jay Tick

[57] ABSTRACT

Electrically conductive leads electrically connect a relay, a source of electrical energy and a radio transmitter for transmitting radio signals in a back up circuit with a burglar alarm. The relay is electrically connected to the electric circuit of a burglar alarm system and is maintained unenergized by said system so that the relay is normally open. When an electrical conductor of the burglar alarm circuit is energized, the relay is energized and closes the back up circuit to actuate the transmitter to transmit radio signals indicating that an electrical conductor of the burglar alarm circuit has been energized.

3 Claims, 6 Drawing Figures

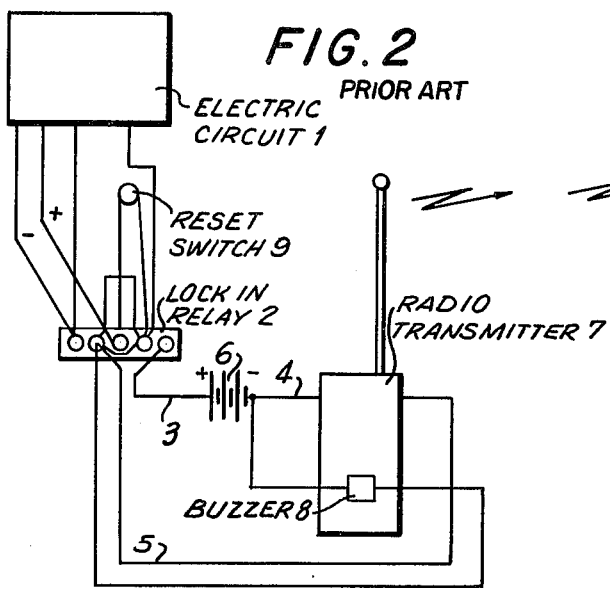
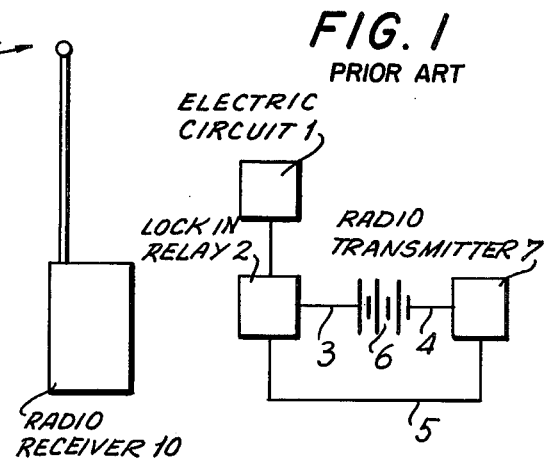
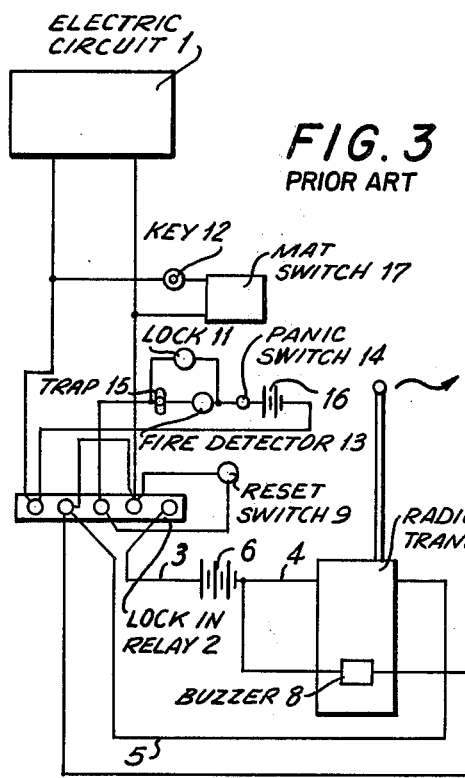
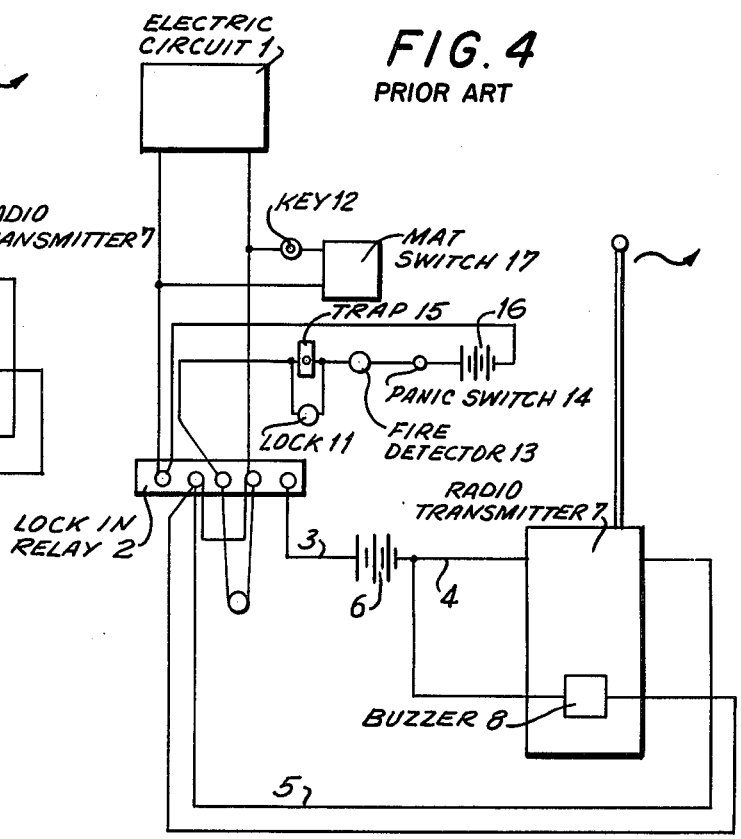

BACK UP ALARM SYSTEM

BACKGROUND OF THE INVENTION

The present invention relates to a back up alarm system. More particularly, the invention relates to a back up alarm system for a burglar alarm system utilizing an electric circuit.

The prior art embodiments of FIGS. 1 to 4 are disclosed in U.S. Pat. No. 4,012,728, issued to the present inventor on Mar. 15, 1977.

Alarm systems are disclosed in U.S. Pat. No. 3,204,222, issued in August, 1965 to Montroy et al, U.S. Pat. No. 3,688,256, issued in August, 1972 to D'Ausilio et al, U.S. Pat. No. 3,703,714, issued in November, 1972 to Andrews and U.S. Pat. No. 3,893,069, issued in July, 1975 to Mason.

Objects of the invention are to provide a back up alarm system for a burglar alarm system, which back up alarm system functions more effectively and more rapidly than a silent burglar alarm system to provide complete protection from burglars, since the back up alarm system functions efficiently, effectively and reliably by wireless transmission to warn of the cutting of an electrical conductor of a burglar alarm system circuit and to warn of the short-circuiting of electrical conductors of a burglar alarm system such as, for example, by wire cutters.

BRIEF DESCRIPTION OF THE DRAWINGS

In order that the invention may be readily carried into effect, it will now be described with reference to the accompanying drawings, wherein:

FIG. 1 is a block diagram illustrating the basic prior art back up alarm system of the invention;

FIG. 2 is a block diagram of a first prior art embodiment of the back up alarm system of the invention;

FIG. 3 is a block diagram of a second prior art embodiment of the back up alarm system of the invention;

FIG. 4 is a block diagram of a third prior art embodiment of the back up alarm system of the invention;

In the FIGS., the same components are identified by the same reference numerals.

DETAILED DESCRIPTION OF THE INVENTION

The back up alarm system of the invention is for a burglar alarm system utilizing an electric circuit 1 having electrical conductors (not shown in the FIGS.).

The back up alarm system of the invention comprises a lock in relay 2 electrically connected to the electric circuit 1 of the burglar alarm system. The relay 2 may comprise any suitable relay having an energizing winding and a relay switch or relay contacts controlled in position by such energizing winding. In the embodiments of FIGS. 2, 3 and 4, the energizing winding of the relay 2 is energized by the circuit 1 of the burglar alarm and maintains the relay contacts normally open, so that as long as the burglar alarm circuit is closed and the burglar alarm system is in operative condition, the relay contacts are open. As soon as a conductor of the burglar alarm circuit 1 of the embodiments of FIGS. 2, 3 and 4 is cut by a burglar, or due to any other circumstance, so that the burglar alarm system becomes inoperative, the relay energizing winding of the relay 2 closes the relay contacts thereof, and the relay energizing winding remains deenergized until it is reset by a reset switch, hereinafter described.

Figure 5:
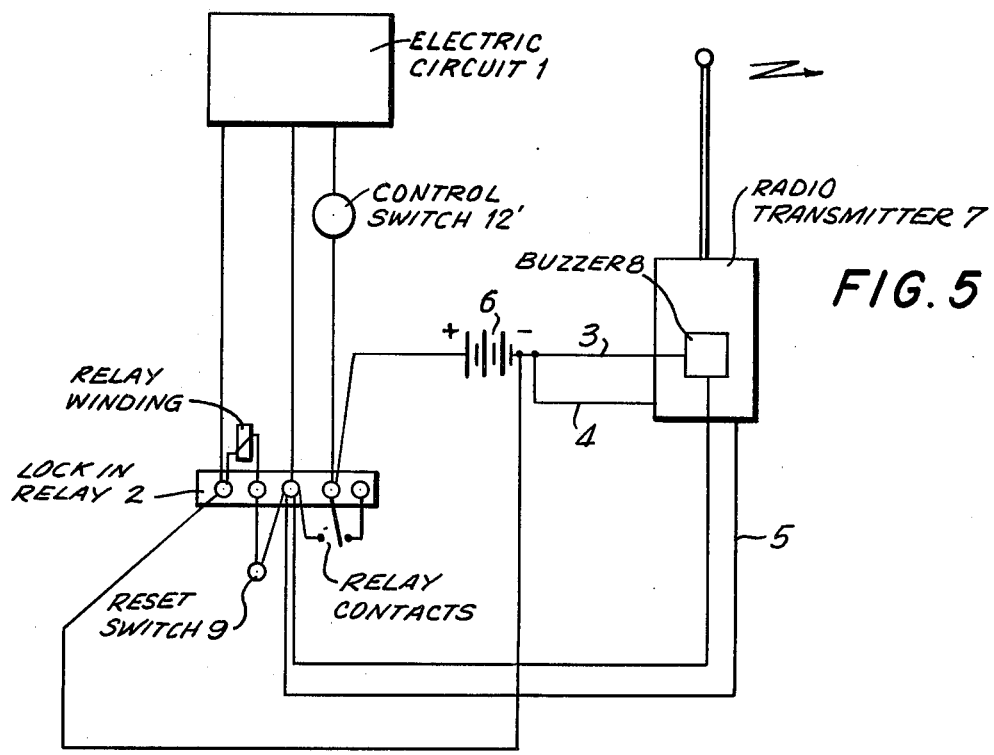
FIG. 5 is a block diagram of a fourth embodiment of the back up alarm system of the invention.
Figure 6:
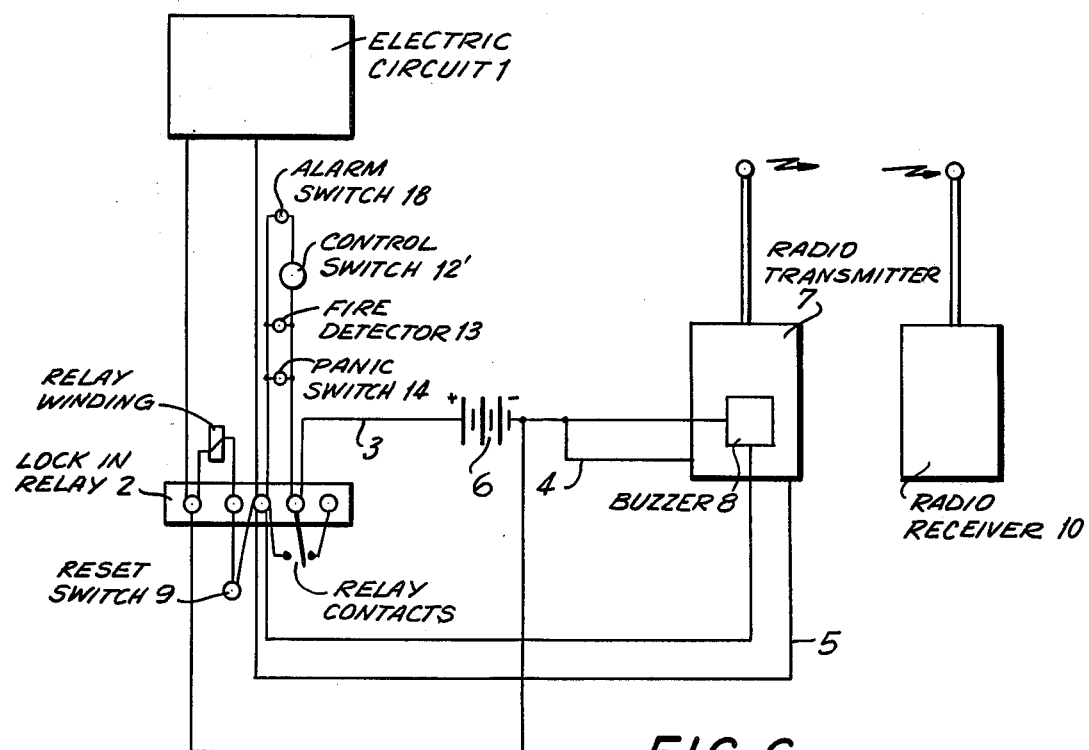
FIG. 6 is a block diagram of a fifth embodiment of the back up alarm system of the invention.

In the embodiments of FIGS. 5 and 6, the energizing winding of the relay 2 is maintained unenergized by the burglar alarm system, as is the circuit 1 of the burglar alarm and said circuit maintains the relay contacts normally open, so that as long as the burglar alarm system is in operative condition, the relay contacts are open. As soon as a conductor of the burglar alarm circuit 1 of the embodiments of FIGS. 5 and 6 is energized or short-circuited, by a burglar, so that the burglar alarm system becomes inoperative, the relay energizing winding of the relay 2 is energized and closes the relay contacts thereof, and the relay energizing winding remains energized until it is reset by the reset switch.

The back up alarm system further comprises electrically conductive leads 3, 4 and 5 electrically connecting the lock in relay 2, a source of electrical energy 6 of any suitable type such as, for example, a battery, and a radio transmitter 7 of any suitable type for transmitting radio signals, in a back up circuit with the burglar alarm circuit, as shown in FIG. 1.

In the embodiments of FIGS. 2, 3 and 4, when an electrical conductor of the burglar alarm circuit 1 is cut, the relay energizing winding of the lock in relay 2 becomes deenergized and permits the relay contacts thereof to close thereby closing the back up circuit to actuate the transmitter 7. When the transmitter 7 of the embodiments of FIGS. 2, 3 and 4 is actuated, it transmits radio signals indicating that an electrical conductor of the burglar alarm circuit 1 has been cut. It also activates an audible alarm such as, for example, a buzzer 8.

In the embodiments of FIGS. 5 and 6, when an electrical conductor of the burglar alarm circuit 1 is energized or short-circuited, the relay energizing winding of the lock in relay 2 becomes energized and permits the relay contacts thereof to close thereby closing the back up circuit to actuate the transmitter 7. When the transmitter 7 of the embodiments of FIGS. 5 and 6 is actuated, it transmits radio signals indicating that an electrical conductor of the burglar alarm circuit 1 has been short-circuited. It also activates the buzzer 8.

A reset switch 9 is electrically connected to the lock in relay 2 for manually resetting the back up circuit, in the embodiments of FIGS. 2, 3, 5 and 6.

A radio receiver 10 of any suitable known type (FIGS. 2 and 6) receives signals transmitted by the transmitter 7 thereby indicating an alarm condition at such receiver.

The embodiments of FIGS. 3 and 4 include a normally open control switch lock 11 and a key 12 which fits a normally closed control switch. In the embodiment of FIG. 6, the normally closed control switch 12' combines a key arrangement which controls a normally open alarm switch or switches 18 and is connected to the lock in relay 2 and the battery 6. The key arrangement is unlocked for operation by a key, as in the embodiments of FIGS. 3 and 4. In the embodiment of FIG. 5, the normally closed control switch 12' controls the electric circuit 1.

In the embodiments of FIGS. 3 and 4, the normally closed control switch or key 12 controls a mat 17 and a normally open alarm switch. The control switch or key 12 is connected to the lock in relay 2 and the battery 16 and is unlocked for operation by a key.

In the embodiment of FIG. 3, a fire detector 13, a panic switch 14, a trap 15 and the battery 16 are connected in circuit with the lock in relay 2. The fire detector 13 and the panic switch 14 should not be controlled by any control switch, unless desired.

The embodiment of FIG. 4 is the same as that of FIG. 3, except that in FIG. 4 the normally open control switch lock 11 controls the trap 15 only, whereas in the embodiment of FIG. 3 it controls the operation of the fire detector 13 and the trap 15.

A trap is a switch or switches, connected in series and normally closed, used as an alarm switch. The trap may be on a door or a window and may comprise any suitable type of alarm switch. The embodiment of FIG. 6 includes the fire detector 13, the panic switch 14 and an alarm switch or switches 18. The alarm switch or switches of the embodiment of FIG. 6 are normally open and are connected in circuit with the lock in relay 2. The alarm switches 18 may be placed on doors or windows and may comprise any suitable type of alarm switches.

While the invention has been described by means of specific examples and in specific embodiments, I do not wish to be limited thereto, for obvious modifications will occur to those skilled in the art without departing from the spirit and scope of the invention.

I claim:

1. A back up alarm system for a burglar alarm system utilizing an electric circuit having electrical conductors for operating a burglar alarm under predetermined circumstances, said back up alarm system comprising relay means electrically connected to the electric circuit of a burglar alarm system having electrical conductors;

a source of electrical energy;

a radio transmitter for transmitting radio signals; and electrically conductive leads electrically connecting the relay means, the source of electrical energy and the radio transmitter in a back up circuit with the burglar alarm in a manner whereby the relay means is maintained unenergized by the burglar alarm system and maintains the relay means normally open as long as the burglar alarm system is in operative condition and when an electrical conductor of the burglar alarm circuit is energized the relay means is energized and closes the back up circuit to actuate the transmitter to transmit radio signals indicating that an electrical conductor of the burglar alarm circuit has been energized.

2. A back up alarm system as claimed in claim 1, further comprising a reset switch electrically connected to the relay means for manually resetting the back up circuit.

3. A back up alarm system as claimed in claim 1, further comprising a radio receiver for receiving signals transmitted by the transmitter thereby indicating an alarm condition.

* * * * *